Figure 1:
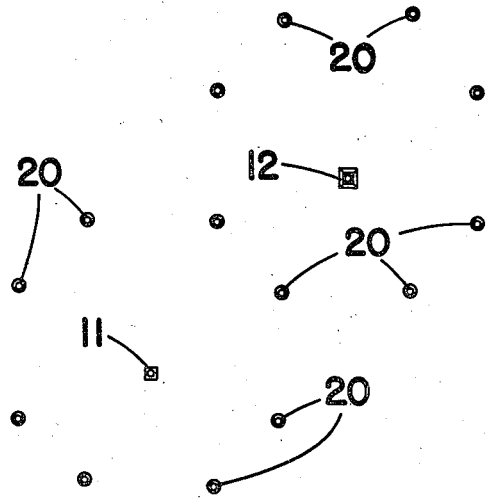

May 11, 1943.  L. H. HODELL ET AL  2,318,689
TRACING GAS THROUGH UNDERGROUND FORMATIONS
Filed Dec. 27, 1941

John J. Heigl
Louis R. Hodell  INVENTORS
BY J. G. McKean
ATTORNEY

Patented May 11, 1943

2,318,689

UNITED STATES PATENT OFFICE 2,318,689

TRACING GAS THROUGH UNDERGROUND FORMATIONS

Louis R. Hodell and John J. Heigl, Tulsa, Okla., assignors to Standard Oil Development Company, a corporation of Delaware Application December 27, 1941, Serial No. 424,614

1 Claim. (Cl. 166—21)

The present invention is directed to a method of tracing the flow of gas through subsurface structures.

In the production of petroleum, substantial amounts of gaseous materials usually are produced concurrently with liquid fractions. It is desirable to keep the pressure of the producing formations as high as possible in order to obtain a maximum recovery of more valuable liquid products. In recent years it has become customary to separate the gaseous fraction from the liquid fraction under as high a pressure as possible and to re-inject the gaseous fraction into the producing formation in order to maintain the pressure of the field.

Generally speaking, an injection well is selected which is more or less central in a group of wells, and the injected gas flows from this single well in several directions through the subsurface formation, and eventually appears in the surrounding wells in admixture with petroleum fractions which the injected gas has aided in removing from the formation. If the field to which gas injection is applied is of any substantial size it is necessary to employ a plurality of injection wells in order to obtain a proper distribution of production from the field.

The results obtained from the reinjection of gas into producing formations are generally beneficial. In most cases the decline curves of fields show an increase in production to result from gas injection. In some instances, however, gas injection appears to have produced no beneficial results, and in other instances the results obtained are beneficial only to a few wells, and are not equally distributed.

It is an object of the present invention to devise a method of tracing reinjected gas through underground formations.

More specifically, it is an object of the present invention to trace the gas injected into a petroleum producing formation from a plurality of injection wells through the underground formation.

By employing the present invention a much more satisfactory control and regulation is available, with respect to repressuring operations. In cases where the reinjected gas is escaping from the reservoir through faults the injection program is ineffective and this waste may be detected and the injection program stopped. On the other hand, if the flow of gas from the injection wells through the formation is unsatisfactory, it may be desirable to select other injection wells and/or increase or decrease the number of injection wells in the field.

Other objects and advantages of the present invention may be seen from a reading of the following description taken in conjunction with the drawing in which—

Figure 2:
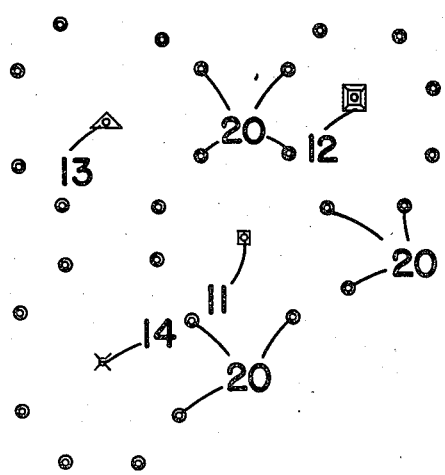

Figs. 1 and 2 diagrammatically illustrate the arrangement of gas injection wells with respect to producing wells in accordance with the present invention.

Generally speaking, it may be stated that the present invention involves the injection of known quantities of tracing gaseous materials with the gas in each injection well, a different tracing agent being employed in conjunction with each injection well in the field, and the quantitative analysis of the gas produced by adjacent wells or by all of the wells in the field for the several gaseous tracing materials employed.

It is desirable that the materials added to the repressuring gas have the following characteristics:

(a) Non-condensible under the pressure and temperature of the reservoir;

(b) Relatively oil and water insoluble;

(c) Not reactable with or adsorbed by other materials in the reservoir;

(d) Amount present in produced gas must be readily estimated by relatively simple tests;

(e) Must be available in relatively large quantities;

(f) Must not be present in the reservoir or in gas reinjected in other wells in the reservoir.

The production from an oil field is, of course, a mixture of hydrocarbons. Generally speaking, methane is separated from the heavier fractions and is used as the injection gas in recycling operations. The methane is generally contaminated with small amounts of heavier hydrocarbons. Accordingly, it is not desirable to employ hydrocarbons for tracing agents.

In view of the above requirements, the number of gaseous tracing agents for employment in underground repressuring operations is quite limited. Few materials have been found which sufficiently comply with the above listed requirements to enable them to be satisfactorily used for tracing the flow of gases through subsurface formations.

It has been found that several gaseous tracing agents are available for use with natural gas in repressuring underground petroleum producing formations. These tracing materials may each be added through a separate injection well in a producing field, and the gas produced by the wells may be analyzed for each tracing agent in order to determine the flow of the gas from each injection well.

Carbon monoxide has been found to be a particularly suitable tracing material, and, in addition thereto, hydrogen, nitric oxide (NO), and nitrogen have been found to be suitable. All of these materials are substantially insoluble in water and oil, do not condense at the reservoir pressures and temperatures, and are not reactable with, or absorbed by, materials generally encountered in the reservoir. As has been pointed out above, methane is almost universally employed as the gas in the repressuring operations and, accordingly, these materials are absent from the gas being traced.

Various chemical tests are well known in the art for determining the presence of carbon monoxide, hydrogen, and nitric oxide. As specific examples of tests available, it may be pointed out that gas may be quantitatively analyzed for carbon monoxide by allowing the gas to come in contact with palladium chloride deposited on a strip of paper, subsequently removing unreduced palladium chloride from the paper, and measuring the amount of palladium remaining on the paper by means of a photo-electric calometer. The presence of nitric oxide may be determined by the use of Greiss reagent (Chemical Abstracts, vol. 28, p. 880, 1934,), or acidic hydrogen peroxide and phenoldisulfonic acid (Chemical Abstracts, vol. 19, p. 261, 1925). The presence of hydrogen may be determined by the employment of phosphomolybdic acid and palladium chloride solution (Chemical Abstracts, vol. 7, p. 3284, 1913).

The presence of nitrogen in gases may be determined by the employment of spectrophotometric technique. One convenient method has been found which includes the steps of passing the gas into a discharge tube, applying a source of high potential across the electrodes of the discharge, and observing the resulting discharge by means of a spectrophotometer. If desired, this method of analysis may be employed for quantitatively determining the presence of hydrogen, carbon dioxide, and nitric oxide, as well as, or in addition to, the determination of the presence of nitrogen. It will be apparent that the employment of this method of analysis may be used to determine the presence of a plurality of tracing agents in a sample, thereby avoiding a multiplicity of analytical methods.

The employment of a plurality of tracing materials in a repressuring operation will now be described with reference to the drawing. In Fig. 1 a gas injection well 11 is arranged in the center of a group of producing wells 20 and, in like manner, an injection well 12 is arranged in the center of another group of producing wells 20. In order to trace the flow of reinjected gas from input well 11 through underground formations, hydrogen is added to the natural gas being reinjected into the well. In like manner, the flow of gas which is reinjected via input well 12 may be determined by the addition of hydrogen to the gas added by this well. The production from producing wells 20 is separated into a liquid and a gaseous fraction, and samples of gas from each well are quantitatively analyzed for the presence both of carbon monoxide and hydrogen.

In Fig. 2 is illustrated a producing field in which the repressuring project is of sufficient magnitude to require four gas injection wells. In Fig. 2, injection well 11 is utilized for the injection of natural gas to which hydrogen has been added as a tracing agent, and 12 is an injection well in which carbon monoxide is used as the tracing agent. In addition, 13 is an injection well to which nitric oxide is the tracing agent, and 14 is an injection well with nitrogen employed as the tracing agent. As in the preceding figure, each injection well is surrounded by a plurality of producing wells, and the production of each well is separated into a liquid and gaseous fraction and samples of the gaseous fraction obtained from each well are analyzed for the presence of each of the gaseous tracing agents. In this manner an accurate estimation of the distribution of the repressuring gas through the petroleum producing formation is possible.

It will be apparent that the proportion of gaseous tracing agent added to the reinjected gas may be varied widely, and that satisfactory results may be obtained throughout a wide range. It has been found that the above disclosed gaseous tracing materials may be injected at a concentration of approximately 500 parts per million, and good results obtained. If desired, of course, substantially higher concentrations may be employed, as well as lesser concentrations.

It is accordingly not our intention to be restricted to the specific embodiments and particular arrangements as above disclosed, but only in accordance with the herewith appended claim.

We claim:

In the process of producing fluids from an underground reservoir, the steps of injecting a gas into the reservoir at a plurality of points, adding a different gaseous tracing agent to the gas injected at each separate point, producing the reservoir from a plurality of points substantial distances from the points of injecting gas in said reservoir, and analyzing the production for the presence of each of said tracing agents.

LOUIS R. HODELL.
JOHN J. HEIGL.